UNITED STATES PATENT OFFICE.

ARNOLD HESS, OF HÖCHST-ON-THE-MAIN, GERMANY, ASSIGNOR TO THE FARBWERKE, VORM. MEISTER, LUCIUS & BRÜNING, OF SAME PLACE.

BLUE WOOL-DYE AND PROCESS OF MAKING SAME.

SPECIFICATION forming part of Letters Patent No. 668,445, dated February 19, 1901.

Application filed January 24, 1900. Serial No. 2,671. (Specimens.)

*To all whom it may concern:*

Be it known that I, ARNOLD HESS, Ph. D., a citizen of the Empire of Germany, residing at Höchst-on-the-Main, Germany, have invented certain new and useful Improvements in the Manufacture of Coloring-Matters, of which the following is a specification.

It is known that in the manufacture of naphthazarin a compound is obtained which is transformed into naphthazarin when heated with acids. I now have found that if this intermediary product be heated with anilin or its homologues and the anilid thus resulting be sulfonated a blue dyestuff may be obtained. To produce this coloring-matter, it is necessary to employ the said bases in such quantity that at least three of their molecular proportions correspond to one molecular proportion of the intermediary product and to heat the mixture till the color, at first green, turns to blue-violet. The combining of the intermediary product with anilin is best carried out in the presence of anilin hydrochlorid and without dissolvents. If glacial acetic acid be used as solvent, heating for some time is necessary to complete the reaction. The sulfonation may be carried out with monohydrate.

If in this process the oxidation product (see German Patent No. 101,372) be substituted for the intermediary product, then the same dyestuff is obtained.

I illustrate the process by the following example: ten parts, by weight, of the intermediary product, fifty parts of anilin, and ten parts of anilin hydrochlorid are heated with stirring for two hours on the water-bath. The mass, at first blue, becomes green, then blue-green, and finally violet-blue. If this coloration is obtained, the cooled product of reaction is poured into dilute hydrochloric acid and the insoluble anilid is filtered off and washed with hot water. The anilid thus obtained is a dark-blue powder soluble in sulfuric acid with a violet and in alcohol anilin with a blue color. It is insoluble in alkalies and dilute acids.

To sulfonate, the anilid is stirred with ten times the quantity of monohydrate at ordinary temperature till a sample is no longer precipitated by hot water. The solution is then poured into water, filtered hot, and the dyestuff salted out.

The dyestuff when dry is a blue-black powder of metallic luster, readily soluble in water with a blue color. Alkali does not change the color of the solution. It dyes wool blue in an acid-bath, and on subsequent treatment with chromium a very fast gray shade is obtained.

Having now described my invention, what I claim is—

1. The herein-described process of manufacturing a blue dyestuff for wool, which consists in heating the naphthazarin intermediate product with a multiple quantity of anilin and sulfonating the anilids thus formed with concentrated sulfuric acid, substantially as set forth.

2. As a new product, the blue dyestuff for wool, derived from combining the naphthazarin intermediate product with not less than three equivalents of anilin and subsequently sulfonating the anilid thus formed, said dyestuff being a blue-black powder of metallic luster, readily soluble in water with a blue-black color, its solution being not changed by alkali, dyeing wool directly blue, the dye becoming on subsequent treatment with chromates a fast gray, substantially as set forth.

3. As a new product, the dyestuff derived from combining the naphthazarin intermediate product with not less than three equivalents of a monoamin of the benzene hydrocarbons and then sulfonating the anilid thus formed, being a blue-black powder of metallic luster, readily soluble in water with a blue color, its solution being not changeable by alkali, dyeing wool directly blue, the dye becoming on subsequent treatment with chromates a fast gray, substantially as set forth.

In testimony that I claim the foregoing as my invention I have signed my name in presence of two subscribing witnesses.

ARNOLD HESS.

Witnesses:
HEINRICH HAHN,
ALFRED BRISBOIS.